United States Patent

[11] 3,630,247

[72] Inventor James P. Cox
Burnaby, British Columbia, Canada
[21] Appl. No. 52,562
[22] Filed July 6, 1970
[45] Patented Dec. 28, 1971
[73] Assignee John Inglis Frozen Foods Company
Modesto, Calif.
Original application Feb. 21, 1968, Ser. No.
707,152, now Patent No. 3,538,969, dated
Nov. 10, 1970. Divided and this application
July 6, 1970, Ser. No. 52,562

[54] SPIRAL TRACK MACHINE FOR TRIMMING
PROJECTIONS FROM GLOBULAR ARTICLES
2 Claims, 3 Drawing Figs.

[52] U.S. Cl. .................................................. 146/81,
146/55
[51] Int. Cl. ............................................. A23n 15/02
[50] Field of Search .................................. 146/81, 83,
55, 85

[56] References Cited
UNITED STATES PATENTS

| | | | |
|---|---|---|---|
| 3,057,385 | 10/1962 | Kuilman ...................... | 146/83 X |
| 3,230,990 | 1/1966 | Van Der Vijver ........... | 146/83 |
| 3,400,740 | 9/1968 | Akesson ...................... | 146/55 X |
| 3,493,024 | 2/1970 | Van Raay .................... | 146/83 |

Primary Examiner—Andrew R. Juhasz
Assistant Examiner—Z. R. Bilinsky
Attorney—Robert W. Beach ABSTRACT: By engagement of pad means with the upper side of a globular article, it is rolled along guideways in a compound rotation, which periodically moves a projection of the article through the slot of the guideways. Such compound rotation is effected by forming the guideways as generally parallel curved convolutions forming a spiral path and moving pad means above such guideways in a direction generally lengthwise of the slot. The pad means is a circular pad which rotates above the spiral guideways. Knife blades are rotated closely beneath the guideways to sever projections of articles extending through the slot of the guideways.

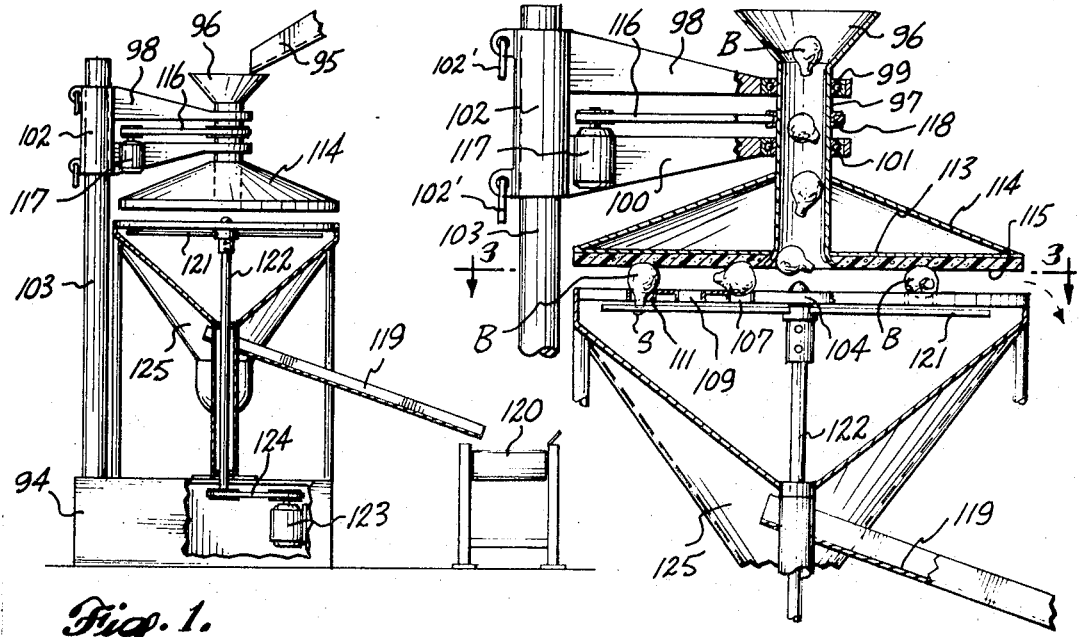
Fig. 1.
Fig. 2.
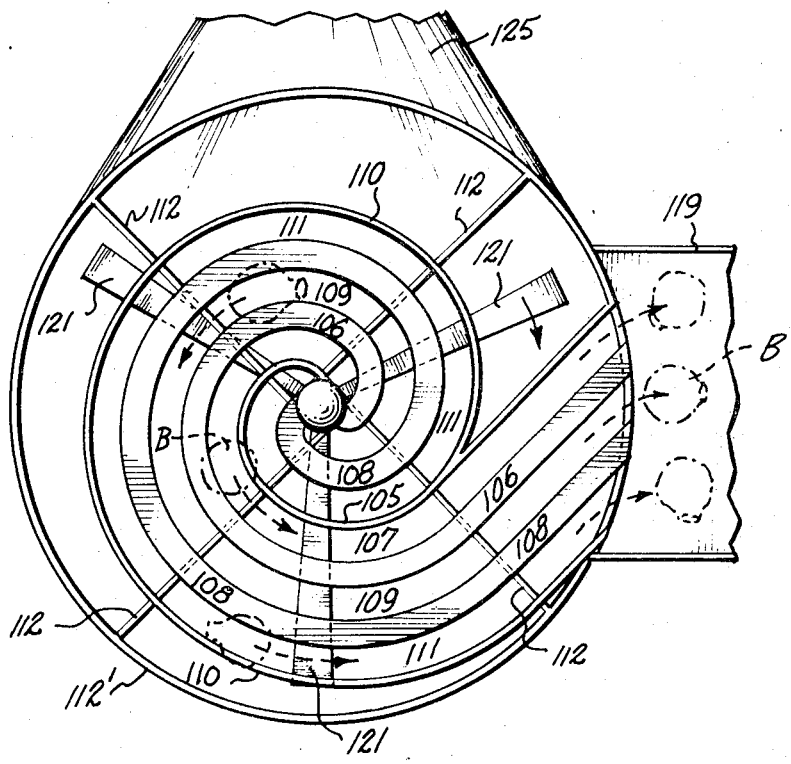
Fig. 3.
INVENTOR
JAMES P. COX
BY
Robert W. Beach
ATTORNEY

SPIRAL TRACK MACHINE FOR TRIMMING PROJECTIONS FROM GLOBULAR ARTICLES

This application is a division of application Ser. No. 707,152 for Machine for Trimming Projections from Globular Articles issued as U.S. Pat. No. 3,538,969.

Brussels sprouts are globular articles, the bodies of which are generally spherical or elongated lengthwise of the stem, to a greater or lesser extent, in the shape of an ellipsoid. The stem projection varies in length and its end is usually more or less uneven or ragged. Heretofore, the stems of such Brussels sprouts have been trimmed by hand manipulation, which has required at least that each Brussels sprout be picked up individually in effecting a stem-trimming operation.

The principal object of the present invention, therefore, is to provide a machine for trimming projections from globular articles, such as the stems of Brussels sprouts, automatically, reliably, and uniformly, so that it is not necessary to manipulate manually each individual article, either during the trimming operation or prior thereto, for the purpose of orienting the article in the proper position for a subsequent trimming operation.

Another object is to provide a machine which will trim projections from globular articles automatically, irrespective of minor variations in shape of the article from generally spherical or ellipsoidal and irrespective of variations in size of such articles within predetermined limits.

It is also a preferred object to provide such a machine which can be adjusted to accommodate articles of different size ranges.

Another object is to provide a machine for trimming projections of globular articles, such as Brussels sprouts, which, while effective, will engage and handle the articles gently so as to avoid or minimize injuring the Brussels sprouts by the necessary manipulation of them.

A particular object is to accomplish the projection-trimming operation by placing the globular article relative to the slot of a machine so that the projection extends through the slot for engagement by a projection-trimming device at the side of the slot opposite the article.

FIG. 1 is an elevation of a machine in accordance with the invention, parts being broken away.

FIG. 2 is an enlarged vertical section through the upper portion of the machine shown in FIG. 1 and FIG. 3 is a horizontal section through such machine taken on line 3—3 of FIG. 2.

There is no appreciable problem in trimming projections of globular articles, such as the stems of Brussels sprouts, if such stems can be positioned predictably with relation to suitable projection-trimming means. The difficult problem is to arrange for placement of such articles without individual manual manipulation so as to position the projections reliably and automatically for engagement by trimming means. Conveniently, the projection of a globular article can be located by a slot having trimming means at one side of it. The objective then is to orient each globular article automatically so that its projection is placed in registry with such slot and is then extended through the slot into position for engagement by the trimming means.

As shown in FIGS. 1 to 3 the machine and its base 94 are of substantially circular horizontal cross section. The articles to be trimmed can be fed to the machine from any suitable supply source through a chute 95, which deposits the articles into a funnel 96, leading into the upright supply tube 97 located concentrically of the machine axis. This feed tube is rotatable, being supported from an upper arm 98 by a bearing 99 and from a lower arm 100 by a bearing 101. Arms 98 and 100 are mounted in cantilever fashion on a split sleeve 102 carried by the upper end of a post 103 mounted on the base 94. Preferably, such sleeve is adjustable elevationally along post 103 and can be secured in a desired position by rotating clamp-operating handles 102'.

Beneath the feed tube 97 is a table 104 on which the articles to be trimmed are deposited. Such table is formed with spiral guideways defining nested spiral slots. Thus, spiral guide rails 105 and 106 define the spiral slot 107 between them. Guide rails 106 and 108 define the spiral slot 109 between them. Guide rails 108 and 110 define the spiral slot 111 between them. The initial portion of the spiral slot 111 is formed between guide rails 105 and 108 before guide rail 110 branches away from guide rail 105. The several guide rails may be supported by a spider having radial arms 112, the inner ends of which are connected together and the outer ends of which are connected by an encircling ring 112'.

Encircling the article supply tube 97 and closely overlying the table 104 is an article-propelling disk 113 having an aperture in its central portion through which the lower end of the supply tube 97 extends. The central portion of the circular plate 113 is supported by the lower end of the supply tube and the peripheral portion of the plate is supported by the margin of a conical member 114 sloping upwardly and inwardly from the peripheral portion of plate 113. The lower surface of this plate is covered with a thick pad 115 of readily deformable resilient sponge material, such as polyurethane. The position of sleeve 102 is adjusted along post 103, as described previously, so as to locate the pad 115 in position to engage the upper portions of articles carried by the guideways of table 104 which have been deposited on such table through the supply tube 97.

The articles deposited on table 104 are moved along the spiral slots 107, 109 and 111 by contact of pad 115 with the upper portions of the articles as such pad is rotated about the axis of supply tube 97. Such rotation is effected by a belt 116 driven by a motor 117 and engaged with a pulley 118 secured on the supply tube 97, as shown in FIGS. 1 ans 2. Movement of the Brussels sprouts along the spiral slots terminate in their discharge from the ends of the slots into any desired type of receptacle, such as the chute 119 shown in FIG. 1 as being arranged to deposit the articles in a conveyor 120.

Projection-trimming blades 121 located close beneath the spiral slots of the table 104 are mounted on the upper end of an upright shaft 122 which is driven by a motor 123 through a drive belt 124. It is preferred that the shaft 122 be mounted for lengthwise adjustment so as to be able to alter the elevation of blades 121 relative to the bottoms of the guide rails of table 104. When the projections of the globular articles being processed, such as the stems of Brussels sprouts, extend downward through one of the slots 107, 109 and 111, they will be trimmed by the rotating knife blade 121.

As the articles, such a a Brussels sprouts, are propelled along the spiral guideways, the stems will be projected periodically and sporadically downward through the slots of the guideways as the Brussels sprouts roll along the guide rails. Movement of the Brussels sprouts by rotation of the pad 115 in contact with them will tend to cause the Brussels sprouts to roll along a straight course tangential to the particular portion of the spiral slot above which it is supported. Because the inner guide rail of each spiral path is shorter than the outer guide rail, the relative movement of the pad 115 and the guide rails of unequal length will exert a force component on the Brussels sprout transversely of the length of the slot which will tend to rotate the Brussels sprout away from the convex guide rail and toward the concave guide rail. Such tendency will cause the article to gyrate as it rolls along a spiral guideway so that a projection will be swung transversely of the slot as the article rolls and, consequently, will move into registry with and be projected through the slot one or more times during its movement along the slot even though some of the time the projection extends transversely of the slot. Each time that a projection is moved into registry with a slot and plunged through it, such projection will be subjected to the trimming action of a blade 121. The debris of the projections and other trimmings from the articles will fall through the spiral slots and collect in the bottom of hopper 125 from which the debris can be removed by air suction.

I claim:

1. A machine for trimming projections from globular articles, comprising a guideway having an elongated slot extending therealong of a width greater than the width of the projection of such a globular article and guiding the article in engagement therewith for movement along said slot, the lengths of said guideway and said slot being substantially parallel and said guideway and said slot being of similar spiral shape over at least a portion of their lengths, article-engaging means engageable with a side of the globular article generally opposite said guideway, moving means effecting relative movement of said article-engaging means and said guideway for effecting movement of the globular article involving rolling along said guideway combined with turning to swing the article projection transversely of the length of said slot into registry with and to project it through said slot, and trimming means at the side of said guideway remote from said article-engaging means for trimming such projection extending through said slot.

2. The machine defined in claim 1, in which the article-engaging means are pad means mounted for rotation about an axis substantially perpendicular to the spiral slot and means effecting rotation of said pad means.

* * * * *